United States Patent
Yu et al.

(10) Patent No.: US 11,594,975 B2
(45) Date of Patent: Feb. 28, 2023

(54) HIGH-PERFORMANCE POWER SUPPLY OF WIDE OUTPUT VOLTAGE RANGE, AND CONTROL METHOD THEREFOR

(71) Applicant: SHENZHEN INFYPOWER CO., LTD, Guangdong (CN)

(72) Inventors: Shiqiang Yu, Guangdong (CN); Biao Lei, Guangdong (CN); Shoudong Fu, Guangdong (CN)

(73) Assignee: SHENZHEN INFYPOWER CO., LTD, Shenzhen (CN)

( * ) Notice: Subject to any disclaimer, the term of this patent is extended or adjusted under 35 U.S.C. 154(b) by 0 days.

(21) Appl. No.: 17/697,920

(22) Filed: Mar. 17, 2022

(65) Prior Publication Data

US 2022/0209679 A1   Jun. 30, 2022

Related U.S. Application Data

(63) Continuation of application No. PCT/CN2020/082290, filed on Mar. 31, 2020.

(30) Foreign Application Priority Data

Sep. 19, 2019   (CN) .......................... 201910886164.1

(51) Int. Cl.
  *H02M 3/335*   (2006.01)
  *H02M 1/00*   (2006.01)
  *H02M 1/12*   (2006.01)
  *H02M 7/06*   (2006.01)

(52) U.S. Cl.
  CPC ..... *H02M 3/33576* (2013.01); *H02M 1/0067* (2021.05); *H02M 1/0083* (2021.05); *H02M 1/126* (2013.01); *H02M 7/068* (2013.01); *H02M 1/0077* (2021.05); *H02M 7/064* (2013.01)

(58) Field of Classification Search
  CPC ........... H02M 3/33576; H02M 1/0067; H02M 1/0077; H02M 1/0083; H02M 1/126; H02M 7/68; H02M 7/64
  See application file for complete search history.

(56) References Cited

U.S. PATENT DOCUMENTS

| | | | |
|---|---|---|---|
| 2010/0314937 A1* | 12/2010 | Jacobson | H02M 3/28 307/18 |
| 2017/0155332 A1* | 6/2017 | Sigamani | H01F 38/00 |
| 2019/0165573 A9* | 5/2019 | Perreault | H02M 3/33546 |
| 2019/0222129 A1* | 7/2019 | Wang | H02M 3/33571 |

FOREIGN PATENT DOCUMENTS

| | | |
|---|---|---|
| CN | 101895142 A | 11/2010 |
| CN | 109936292 A | 6/2019 |
| CN | 110071637 A | 7/2019 |

OTHER PUBLICATIONS

International Search Report of PCT Patent Application No. PCT/CN2020/082290 dated Jun. 19, 2020.

* cited by examiner

*Primary Examiner* — Jue Zhang

(57) ABSTRACT

The present disclosure provides a high-performance power supply of a wide output voltage range and a control method thereof. The high-performance power supply of a wide output voltage range includes M rectification branches and a serial to parallel conversion module. The technical solution of the present disclosure solves the problem in the prior art that it is still difficult to obtain a good performance within a full output voltage range under a wide output voltage requirement.

9 Claims, 9 Drawing Sheets

HIGH-PERFORMANCE POWER SUPPLY OF WIDE OUTPUT VOLTAGE RANGE, AND CONTROL METHOD THEREFOR

CROSS REFERENCE TO RELATED APPLICATIONS

The present application is a Continuation application of PCT Application No. PCT/CN2020/082290 filed on Mar. 31, 2020, which claims the benefit of Chinese Patent Application No. 201910886164.1 filed on Sep. 19, 2019. All the above are hereby incorporated by reference in their entirety.

FIELD

The present disclosure belongs to the technical field of power equipment, and in particular relates to a high-performance power supply of a wide output voltage range and a control method thereof.

BACKGROUND

With the increase of application scenarios, the requirements for an output voltage range of a power supply are also getting higher and higher. For example, in the application of electric vehicle charging, since the same charging pile needs to charge different vehicle models, logistics vehicles and small-size vehicles need to be charged at a low voltage of 200 to 300 V; large-size buses need to be charged at a charging voltage as high as 800 to 900 V; and ordinary passenger vehicles need to be charged at about 400 to 500 V. Therefore, a charging power supply is required to have a high-efficiency output in a very wide output voltage range.

The maximum output voltage of an ordinary charging power module is 800 V or below, and the power will be limited when the low voltage is 600 V or below. To increase the output voltage, it is necessary to replace a rectifier diode with higher voltage withstand, so that the cost of the device is greatly increased. To increase the output power at a low voltage, it is necessary to replace a diode and a primary switch tube with higher current capacity and a transformer with a larger volume, so that the cost and volume are significantly increased, and the conversion efficiency is low at the low voltage. In order to meet the requirement of an output in a wide voltage range, some optimization solutions have emerged. For example, transformer windings are switched by a multiway switch to extend the output range and efficiency of the power supply. In this way, one more optimal working point will be added on the basis of one optimal working point of the conventional power supply to obtain better performance. For another example, two outputs are connected in parallel or in series through a switch, which means that the optimal working point of a single output is extended to two optimal working points through the serial and parallel connection of the outputs, so as to obtain a wider output voltage and higher performance (efficiency). Although, through the above optimization, the optimal working point of the ordinary power supply can be extended to two optimal working points, so as to obtain two better output characteristics, for a charging requirement in an ultra-wide range (such as 150 V to 1000 V), there is still the following problem: it is still difficult to obtain a good performance in a full output voltage range under a wide output voltage requirement.

SUMMARY

Technical Problem

The technical problem to be solved by the present invention is to provide a high-performance power supply of a wide output voltage range and a control method thereof, aiming to solve the problem in the prior art that it is still difficult to obtain a good performance within a full output voltage range under a wide output voltage requirement.

Solution for the Problem

Technical Solution

In order to solve the above-mentioned technical problem, the present invention is implemented in the following way: a high-performance power supply of a wide output voltage range includes M rectification branches, M being an integer, and M≥2. Each rectification branch is provided with a transformer, a rectification circuit, a positive output electrode and a negative output electrode; each transformer includes N secondary windings, N being an integer, and N≥1; the N secondary windings include at least N+1 output terminals; the at least N+1 output terminals include one common terminal, and the remaining N output terminals, the common terminal and the corresponding rectification circuit form L rectification passages having predetermined voltage values and different paths, wherein L≥1; each rectification passage has a positive pole and a negative pole; the positive poles form the positive output electrodes, and the negative poles form the negative output electrodes; at least L−1 rectification passages among the L rectification passages are connected in series with a gating switch; the high-performance power supply of a wide output voltage range further includes a serial to parallel conversion module; the serial to parallel conversion module is provided with a positive connection line, a negative connection line and a plurality of conversion switches; the positive output electrode of the first rectification branch is electrically connected to the positive connection line; the negative output electrode of the rectification branch is electrically connected to the negative connection line through the conversion switch; the negative output electrode of the Mth rectification branch is electrically connected to the negative connection line; the positive output electrode of the rectification branch is electrically connected to the positive connection line through the conversion switch; the positive output electrodes of the remaining second to (M−1)th rectification branches are electrically connected to the positive connection line through the conversion switches, respectively; the negative output electrodes of the remaining second to (M−1)th rectification branches are electrically connected to the negative connection line through the conversion switches, respectively; the negative output electrode of the Kth rectification branch is electrically connected to the positive output electrode of the (K+1)th rectification branch through the conversion switch, wherein K being an integer, K≥1 and K+1≤M.

According to another aspect of the present disclosure, a control method applied to the aforementioned high-performance power supply of a wide output voltage range is provided. Control driving signals applied to a primary high-frequency conversion circuit in each rectification branch are staggered from each other by a certain angle and work in an interleaving working mode.

Beneficial Effects of the Invention

Beneficial Effects

Compared with the prior art, the present disclosure has the following beneficial effects:

The high-performance power supply of a wide output voltage range provided by the present disclosure is used to perform transformer voltage outputting on load equipment; by adjusting the corresponding conversion switches, the plurality of rectification branches work in a parallel mode to output a voltage or work in a series mode to output a voltage; furthermore, a corresponding working winding proportion is selected by cooperation with a ratio of secondary windings of each rectification branch, thus achieving a wider output voltage range and achieving work matching matched with a rated voltage of the load equipment; thus, the power supply obtains a good performance in the full output voltage range under the wide output voltage requirement. At the same time, applying the aforementioned interleaving control method in the present disclosure can reduce output current ripples and reduce electromagnetic interference (EMI), thereby reducing the output inductance and output filter capacitance and the volume of a filter and reducing the cost.

BRIEF DESCRIPTION OF THE DRAWINGS

Drawings

Figure 1:
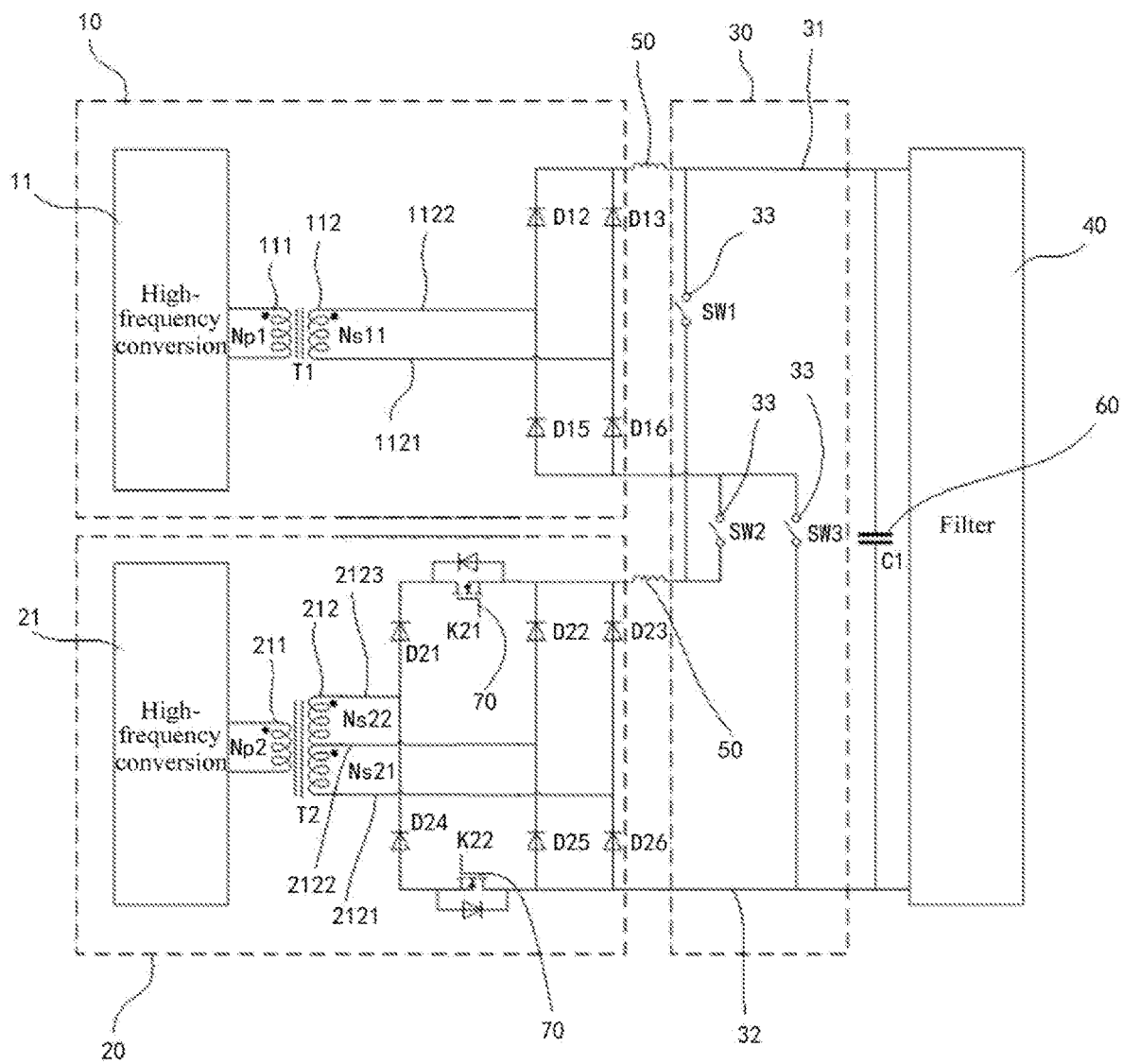
FIG. 1 is a schematic circuit diagram of a first embodiment of a high-performance power supply of a wide output voltage range of the present invention.

In the drawings, reference signs in the drawings:

10: first rectification branch; 11: first primary high-frequency conversion circuit; 111: first primary winding; 112: first secondary winding; 1121: first common terminal; 1122: first output terminal a; 1123: first output terminal b; 20: second rectification branch; 21: second primary high-frequency conversion circuit; 211: second primary winding; 212: second secondary winding; 2121: second common terminal; 2122: second output terminal a; 2123: second output terminal b; 90: third rectification branch; 91: third primary high-frequency conversion circuit; 911: third primary winding; 912: third secondary winding; 9121: third common terminal; 9122: third output terminal a; 9123: third output terminal b; 40: output filter; 50: inductance element; 60: filter capacitor; 70: gating switch; 81: first level measurement point; 82: second level measurement point; 83: first level test resistor; 84: second level test resistor; 30: serial to parallel conversion module; 31: positive connection line; 32: negative connection line; 321: reference ground connection point; 33: conversion switch.

DETAILED DESCRIPTION OF THE EMBODIMENTS

Implementation Modes of the Present Invention

In order to make the objectives, technical solutions and advantages of the present disclosure clearer, the present disclosure is further described below in detail with reference to accompanying drawings and embodiments. It should be understood that the specific embodiments described here are merely to explain the present disclosure, and not intended to limit the present disclosure.

It should be noted that when an element is referred to as being "fixed to" or "disposed on" another element, it can be directly on the other element or indirectly on the other element. When an element is referred to as being "connected to" another element, it can be directly connected to the other element or indirectly connected to the other element.

It should be understood that orientations or positional relationships indicated by the terms "length", "width", "upper", "lower", "front", "rear", "left", "right", "vertical", "horizontal", "top", "bottom", "inside", "outside", etc. are based on the orientations or positional relationships shown in the accompanying drawings, which are only for the convenience of describing the present application and simplifying the description, instead of indicating or implying that devices or elements indicated must have particular orientations, and be constructed and operated in the particular orientations, so that these terms are not construed as limiting the present disclosure.

In addition, the terms "first" and "second" are used for descriptive purposes only and are not to be understood to indicate or imply relative importance or to imply the number of indicated technical features. Therefore, features defined by "first" and "second" can explicitly instruct or impliedly include one or more features. In the description of the present application, unless expressly specified otherwise, the meaning of the "plurality" or "more" is two or more than two.

Explanation 1: When a flowing direction of a current along a diode is a positive direction, the current can be conducted through the diode, and when a flowing direction of the current along the diode is a negative direction, the current can be stopped by the diode.

Explanation 2: In the present disclosure, when a voltage is output from a positive pole and a negative pole of a secondary winding, a current passage formed in a rectification circuit is called a rectification passage.

In the present disclosure, a high-performance power supply of a wide output voltage range includes M rectification branches, M being an integer, and M≥2. Each rectification branch is provided with a transformer, a rectification circuit, a positive output electrode and a negative output electrode; each transformer includes N secondary windings, N being an integer, and N≥1; the N secondary windings include at least N+1 output terminals; the at least N+1 output terminals include one common terminal, and the remaining N output terminals, the common terminal and the corresponding rectification circuit form L rectification passages having predetermined voltage values and different paths, wherein L≥1; each rectification passage has a positive pole and a negative pole; the positive poles form the positive output electrodes, and the negative poles form the negative output electrodes; at least L−1 rectification passages among the L rectification passages are connected in series with a gating switch; the high-performance power supply of a wide output voltage range further includes a serial to parallel conversion module; the serial to parallel conversion module is provided with a positive connection line, a negative connection line and a plurality of conversion switches; the positive output electrode of the first rectification branch is electrically connected to the positive connection line; the negative output electrode of the rectification branch is electrically connected to the negative connection line through the conversion switch; the negative output electrode of the Mth rectification branch is electrically connected to the negative connection line; the positive output electrode of the rectification branch is electrically connected to the positive connection line through the conversion switch; the positive output electrodes of the remaining second to (M−1)th rectification branches are electrically connected to the positive connection line through the conversion switches, respectively; the negative output electrodes of the remaining second to (M−1)th rectification branches are electrically connected to the negative connection line through the conversion switches, respectively; the negative output electrode of the Kth rectification branch is electrically connected to the positive output electrode of the (K+1)th rectification branch through the conversion switch, wherein K being an integer, K≥1 and K+1≤M.

Figure 7:
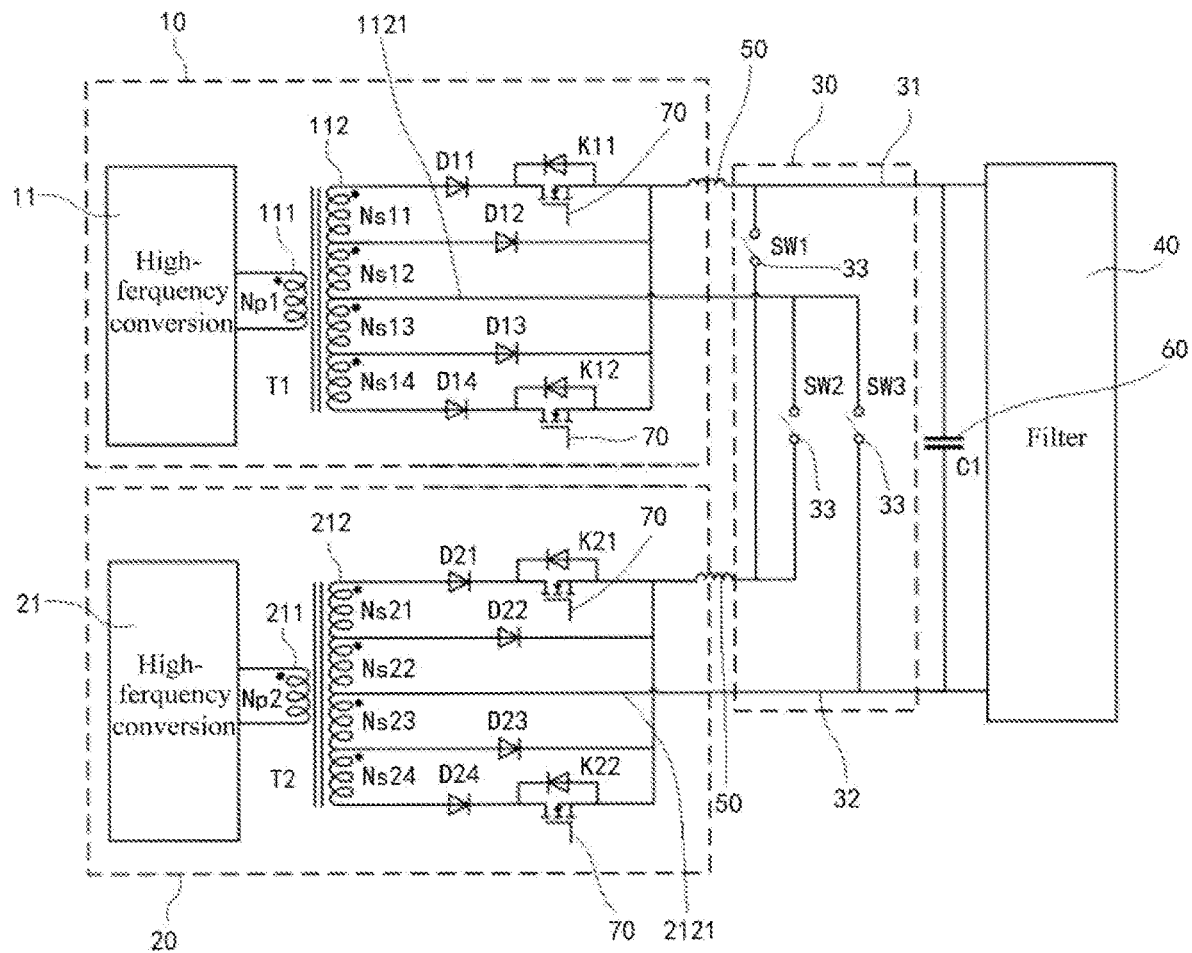
FIG. 7 is a schematic circuit diagram of a seventh embodiment of a high-performance power supply of a wide output voltage range of the present invention.
Figure 8:
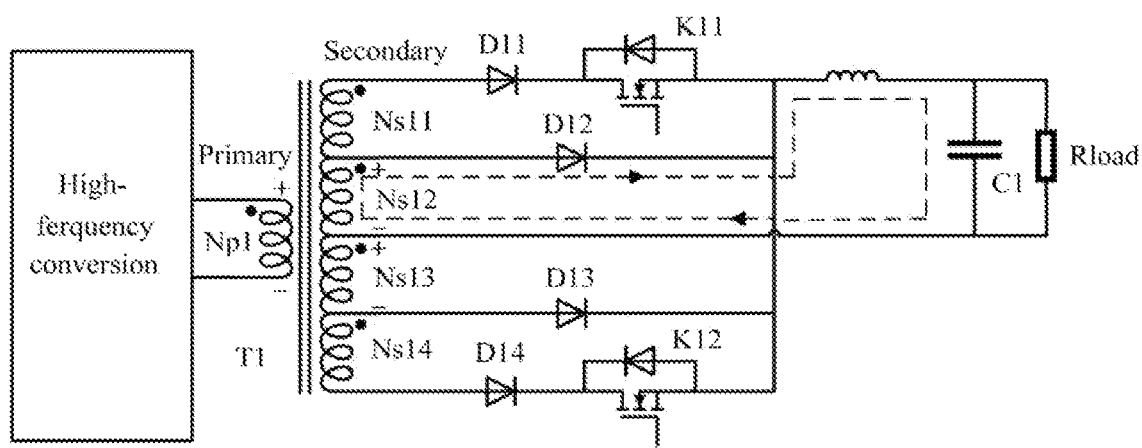
FIG. 8 is a schematic diagram I of one rectification passage formed by full-wave rectification in the seventh embodiment.
Figure 9:
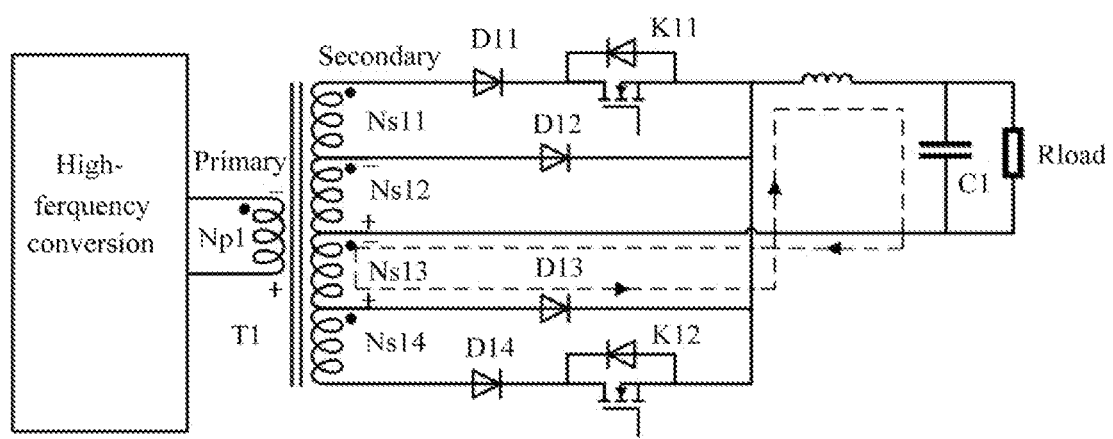
FIG. 9 is a schematic diagram II of the same rectification passage as that shown in FIG. 8 and formed by full-wave rectification in the seventh embodiment.

The present application mainly relates to, but not limited to, full-bridge rectification and full-wave rectification, thus obtaining a direct current output. As shown in FIG. 1 to FIG. 6, schematic diagrams of obtaining a direct current output by full-bridge rectification are illustrated, and FIG. 7 illustrates a schematic diagram of obtaining a direct current output by full-wave rectification. In the full-bridge rectification shown in FIG. 1 to FIG. 6, each rectification branch has N secondary windings. Correspondingly, there are also N rectification passages formed by the common terminal, the remaining N output terminals, and the corresponding rectification circuit, i.e., L=N. The N rectification passages have different paths. In the full-wave rectification shown in FIG. 7, each rectification branch has N secondary windings. Correspondingly, there are L=(½)*N rectification passages formed by the common terminal, the remaining N output terminals, and the corresponding rectification circuit. As shown in FIG. 8 and FIG. 9, a principle analysis process of the same rectification passage formed is illustrated. The dotted lines and arrows in FIG. 8 and FIG. 9 represent a flowing direction of a current in a rectification process, and other principles are the same and will not be repeatedly described.

As shown in FIG. 1, a schematic circuit diagram of a high-performance power supply of a wide output voltage range is illustrated. In the first embodiment, the high-performance power supply of a wide output voltage range includes a first rectification branch 10 and a second rectification branch 20. The first rectification branch 10 is connected to a first transformer T1 through a first primary high-frequency conversion circuit 11 for voltage transformation, and the second rectification branch 20 is connected to a second transformer T2 through a second primary high-frequency conversion circuit 21 for voltage transformation. In the first rectification branch 10, the first transformer T1 is provided with a first primary winding 111 and a first secondary winding 112, and the only two output terminals (i.e., a first common terminal 1121 and a first output terminal a 1122 shown in FIG. 1) are led out from the first secondary winding 112. The first common terminal 1121 and the first output terminal a 1122 are connected with the corresponding rectification circuit to form a unique rectification passage of the first rectification branch 10 (the rectification form that rectifies an alternating current into a direct current in the first embodiment is full-bridge rectification). In the second rectification branch 20, the second transformer T2 is provided with a second primary winding 211 and a second secondary winding 212, and three output terminals (i.e., a second common terminal 2121, a second output terminal a 2122 and a second output terminal b 2123 shown in FIG. 1) are led out from the second secondary winding 212. The second common terminal 2121 and the second output terminal a 2122 are connected with the corresponding rectification circuit to form a first rectification passage in the second rectification branch 20; and the second common terminal 2121 and the second output terminal b 2123 are connected with the corresponding rectification circuit to form a second rectification passage in the second rectification branch 20. A gating switch is connected in series in the rectification circuit that forms the second rectification passage. In addition, the high-performance power supply of a wide output voltage range further includes a serial to parallel conversion module 30. The serial to parallel conversion module 30 is provided with a positive connection line 31, a negative connection line 32 and a plurality of conversion switches 33. Each rectification passage has a positive pole and a negative pole. All the positive poles form the positive output electrode of the corresponding rectification branch, and all the negative poles form the negative output electrode of the corresponding rectification branch. In the first embodiment, the positive output electrode of the first rectification branch 10 is electrically connected to the positive connection line 31; the negative output electrode of the second rectification branch 20 is electrically connected to the negative connection line 32; the negative output electrode of the first rectification branch 10 is electrically connected to the negative connection line 32 through one conversion switch 33; and the positive output electrode of the second rectification branch 20 is electrically connected to the positive connection line 31 through one conversion switch 33. Between the first rectification branch 10 and the second rectification branch 20, the negative output electrode of the first rectification branch 10 and the positive output electrode of the second rectification branch 20 are electrically connected through one conversion switch 33.

The high-performance power supply of a wide output voltage range further includes an output filter 40. The positive connection line 31 is electrically connected to a positive input terminal of the output filter 40; the negative connection line 32 is electrically connected to a negative input terminal of the output filter 40; load equipment is connected to the output terminal of the output filter 40 to achieve load power consumption (for example, a storage battery of an automobile is charged).

In the first embodiment, the first rectification branch 10 is a classical rectification circuit design with only one transformed output voltage value, and the rectification circuit is connected between the two output terminals of the secondary winding to form the unique rectification passage. The second rectification branch 20 has two transformed output voltage values, namely: a transformed voltage value output by the first rectification passage of the second rectification branch 20 and a transformed voltage value output by the second rectification passage of the second rectification branch 20. Therefore, by converting and selecting different conversion switches 33, a plurality of different transformed voltage values are output, so as to meet a voltage output requirement for power consumption of more loads. As shown in FIG. 1: the two conversion switches 33 connected to the positive output electrode of the second rectification branch 20 are turned off, and the conversion switch 33 between the negative output electrode of the first rectification branch 10 and the negative connection line 32 is turned on; at this time, only the first rectification branch 10 will work and output a transformed voltage. The conversion switch 33 between the positive output electrode of the second rectification branch 20 and the positive connection line 31 is turned on; the conversion switch 33 between the positive output electrode of the second rectification branch 20 and the negative output electrode of the first rectification branch 10 is turned off; the conversion switch 33 between the negative output electrode of the first rectification branch 10 and the negative connection line 32 is turned off; at this time, only the second rectification branch 20 will work to output a transformed voltage. The conversion switch 33 between the negative output electrode of the first rectification branch 10 and the negative connection line 32 is turned on; the conversion switch 33 between the positive output electrode of the second rectification branch 20 and the positive connection line 31 is turned on; the conversion switch 33 between the positive output electrode of the second rectification branch 20 and the negative output electrode of the first rectification branch 10 is turned off; at this time, the first rectification branch 10 and the second rectification branch 20 are connected in parallel to output a transformed voltage. By turning on or turning off the gating switch to select the first rectification passage and the second rectification passage of the second rectification branch 20, the transformed voltage value between the positive output electrode and negative output electrode of the first rectification branch 10 in parallel connection is equal to the transformed voltage value between the positive output electrode and negative output electrode of the second rectification branch 20. The conversion switch 33 between the negative output electrode of the first rectification branch 10 and the negative connection line 32 is turned off; the conversion switch 33 between the positive output electrode of the second rectification branch 20 and the positive connection line 31 is turned off; the conversion switch 33 between the positive output electrode of the second rectification branch 20 and the negative output electrode of the first rectification branch 10 is turned on; at this time, the first rectification branch 10 and the second rectification branch 20 are connected in series to output a transformed voltage; at this time, the gating switch can be turned on or turned off to randomly select the first rectification passage or the second rectification passage in the second rectification branch 20 to be connected in series with the first rectification branch 10.

In each rectification branch, a rectification circuit formed by connecting diodes is connected between each output terminal of the secondary winding and the positive output electrode as well as the negative output electrode, respectively. As shown in FIG. 1, in the first rectification branch 10, diodes D12 and D15 are respectively provided on the rectification circuits between the first output terminal a 1122 of the first secondary winding 112 and the formed positive output electrode and negative output electrode; diodes D13 and D16 are provided on the rectification circuits between the first common terminal 1121 and the formed positive output electrode and negative output electrode; the first output terminal a 1122 is connected to the anode of the diode D12 and the cathode of the diode D15, respectively; the first common terminal is connected to the anode of the diode D13 and the cathode of the diode D16, respectively; the cathodes of the diode D12 and the diode D13 are connected to the positive output electrode; and the anodes of the diode D15 and the diode D16 are connected to the negative output electrode. In the second rectification branch 20, a diode D21 is provided on the rectification circuit between the second output terminal b 2123 of the second secondary winding 212 and the formed positive output electrode, and a first gating switch 70 is provided on this rectification circuit; a diode D24 is provided on the rectification circuit between the second output terminal b 2123 and the formed negative output electrode, and a second gating switch 70 is provided on this rectification circuit; the second output terminal b 2123 is connected to the anode of the diode D21 and the cathode of the diode D24, respectively; the cathode of the diode D21 is connected to one terminal of the first gating switch 70; the other terminal of the gating switch 70 is connected to the positive output electrode; and the anode of the diode D24 is connected to one terminal of the second gating switch 70, and the other terminal of the second gating switch 70 is connected to the negative output electrode. Generally, the diode D21 and the first gating switch 70 are connected in series, and the transposition of their positions will not affect the implementation of this embodiment. Similarly, the positions of the diode D24 and the second gating switch 70 can also be interchanged; a diode D22 and a diode D25 are respectively provided on the rectification circuits between the second output terminal a 2122 and the formed positive output electrode and negative output electrode; a diode D23 and a diode D26 are respectively provided on the rectification circuits between the second common terminal 2121 and the formed positive output electrode and negative output electrode; the second output terminal a 2122 is connected to the anode of the diode D22 and the cathode of the diode D25, respectively; the second common terminal 2121 is connected to the anode of the diode D23 and the cathode of the diode D26, respectively; the cathodes of the diode D22 and the diode D23 are connected to the positive output electrode; and the anodes of the diode D25 and the diode D26 are connected to the negative output electrode.

Alternatively, in the first embodiment, the method for rectification through diodes can be replaced by a rectification method for synchronously rectifying Metal-Oxide-Semiconductor Field-Effect Transistors (MOSFETs, field-effect transistors which can be widely used in an analog circuit and a digital circuit), that is, diodes are replaced with MOSs in a rectification circuit to improve the efficiency.

As shown in FIG. 1, in the second rectification branch 20, when the two gating switches 70 are turned off, a winding Ns21 formed between the second output terminal a 2122 and the second common terminal 2121 performs voltage transformation at this time; when the two gating switches 70 are turned on, a winding (Ns21+Ns22) formed between the second common terminal 2121 and the second output terminal b 2123 performs voltage transformation at this time.

Specifically, in each rectification branch, an inductance element 50 is provided between the positive output electrode and the positive connection line 31 (or an inductance element 50 is provided between the negative output electrode and the negative connection line 32). As shown in FIG. 1, an inductance element 50 is arranged between the positive output electrode of the first rectification branch 10 and the positive connection line 31. An inductance element 50 is provided between the positive output electrode of the second rectification branch 20 and the positive connection line 31 in parallel connection (and between the negative output electrodes of the first rectification branch 10 and the negative connection line 32 in serial connection). Further, a filter capacitor 60 is provided between the output filter 40 and the serial to parallel conversion module 30.

Figure 2:
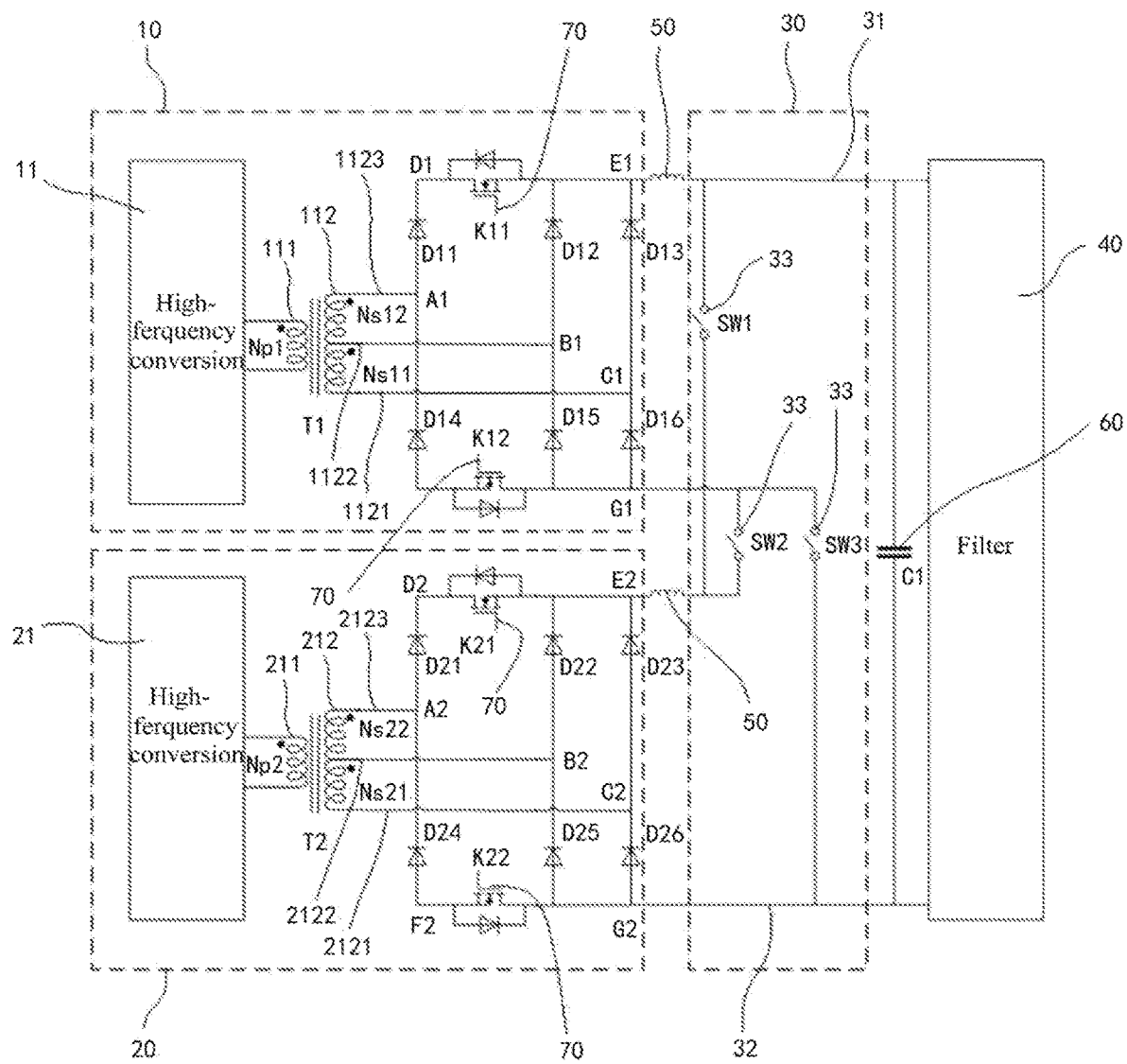
FIG. 2 is a schematic circuit diagram of a second embodiment of a high-performance power supply of a wide output voltage range of the present invention.

As shown in FIG. 2, a schematic circuit diagram of a high-performance power supply of a wide output voltage range of a second embodiment is illustrated. In the second embodiment, the secondary winding of each transformer includes three output terminals, that is, the first secondary winding 112 of the first transformer T1 is provided with three output terminals, which are the first common terminal 1121, the first output terminal a 1122 and the second output terminal b 1123 in the first transformer T1, and are the second common terminal 2121, the second output terminal a 2122 and the second output terminal b 2123 in the second transformer T2. In the secondary winding of each transformer, the number of turns of secondary windings between the common terminal and the other two output terminals increases in sequence. For example, in the first secondary winding 112 of the first transformer T1, the number of turns of the winding Ns11 between the first common terminal 1121 and the first output terminal a 1122 is less than the number of turns of the winding (Ns11+Ns12) between the first common terminal 1121 and the second output terminal b 1123. The second secondary winding 212 of the second transformer T2 has the same situation as the first transformer T1, that is, the number of turns of the winding Ns21 is less than the number of turns of the winding (Ns21+Ns22). In the rectification passage of the first rectification branch, a diode D13 (or the diode is replaced with a synchronous rectification MOSFET) is provided on the rectification circuit between the first common terminal 1121 and the positive output electrode, but no gating switch 70 is provided. A diode D16 (or the diode is replaced with a synchronous rectification MOSFET) is provided on the rectification circuit between the first common terminal and the negative output electrode, but no gating switch 70 is provided. A diode D12 (or the diode is replaced with a synchronous rectification MOSFET) is provided on the rectification circuit between the first output terminal a 1122 and the positive output electrode, but no gating switch 70 is provided. A diode D15 (or the diode is replaced with a synchronous rectification MOSFET) is provided on the rectification circuit between the first output terminal a 1122 and the negative output electrode, but no gating switch 70 is provided. A gating switch 70 and a diode D11 (or the diode is replaced with a synchronous rectification MOSFET) are provided on the rectification circuit between the first output terminal b 1123 and the positive output electrode. A gating switch 70 and a diode D14 (or the diode is replaced with a synchronous rectification MOSFET) are provided on the rectification circuit between the first output terminal b 1123 and the negative output electrode. Therefore, two rectification passages are formed in the first rectification branch, that is: a corresponding rectification circuit connected between the first common terminal 1121 and the first output terminal a 1122 forms the first rectification passage, and a corresponding rectification circuit connected between the first common terminal 1121 and the second output terminal b 1123 forms the second rectification passage. Similarly, two rectification passages are also correspondingly formed in the second rectification branch. Compared with the first embodiment, the second embodiment is also provided with a first rectification branch 10 and a second rectification branch 20. The second rectification branch 20 of the second embodiment has the completely same circuit layout as that of the second rectification branch 20 of the first embodiment, and the difference is that the first rectification branch 10 of the second embodiment and the second rectification branch 20 of the second embodiment are the same in circuit layout.

In the second embodiment, the first rectification branch 10 and the second rectification branch 20 are both ratio-adjustable high-frequency rectification branches, and each rectification branch has only one rectification passage provided with a gating switch, which can achieve two optimal working points in each rectification branch. For simplicity, it is designed that parameters of the first rectification branch 10 are the same as those of the second rectification branch 20. The parameter design of the first rectification branch 10 is taken as an example. A ratio of the number of turns of the winding Ns11 to the number of turns of the winding Ns12 is K, K=7/3. If the design parameters of the power supply cause the highest output voltage of the first rectification branch 10 to be a first optimal working point U11, a second optimal working point of the first rectification branch 10 is U12=7/(7+3)=0.7U11. Since the first rectification branch 10 and the second rectification branch 20 have the same design, the first optimal working point of the second rectification branch 20 is U21=U11, and the second optimal working point of the second rectification branch 20 is U22=U12=0.7U21. When outputs of the first rectification branch 10 and the second rectification branch 20 are connected in parallel through the serial to parallel conversion module 30, there are two optimal working points for the output of the whole power supply: U=U11=U21 and 0.7 U=U12=U22. When the outputs of the first rectification branch 10 and the second rectification branch 20 are connected in series through the serial to parallel conversion module 30, there are another two optimal working points for the output of the whole power supply: 2 U=U11+U21 and 1.4 U=U12+U22. In this way, four optimal working points 0.7 U, U, 1.4 U and 2 U can be obtained through winding transformation and serial-parallel connection of the first secondary winding 112 and the second secondary winding 212. In the present disclosure, when the output works in series, by controlling the corresponding gating switches 70 in the ratio-adjustable high-frequency rectification passage, the first rectification branch 10 works in a mode of the first optimal working point U, and the second rectification branch 20 works in a mode of the second optimal working point 0.7 U; or if the working states of the two branches are interchanged, or if the first rectification branch 10 and the second rectification branch 20 alternately work in the two modes, a fifth optimal working point: 1.7 U=U+0.7 U can be obtained. Therefore, in this embodiment, the power supply can totally have five optimal working points: 0.7 U, U, 1.4 U, 1.7 U, and 2 U, so that the power supply obtains a good overall performance in the whole output voltage range. For example, U is designed to be 500 V. In this way, the embodiment of the present disclosure can work at the optimal working points at 350 V, 500 V, 700 V, 850 V, and 1000 V, so that the power supply has a good performance in a wide voltage range and obtains high efficiency.

The second embodiment is the same as the first embodiment except the above difference, and will not be described here.

Figure 3:
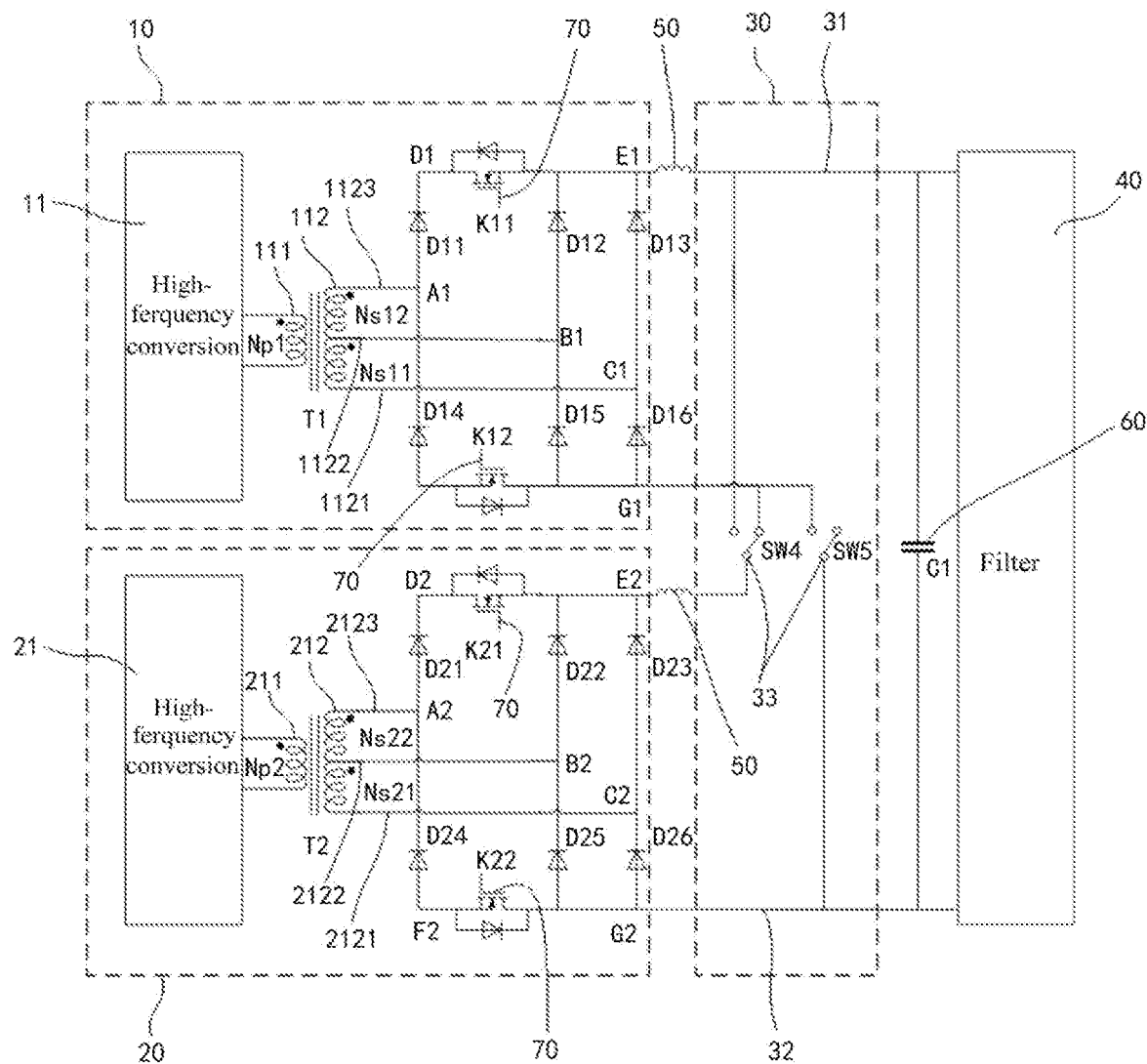
FIG. 3 is a schematic circuit diagram of a third embodiment of a high-performance power supply of a wide output voltage range of the present invention.

As shown in FIG. 3, a schematic circuit diagram of a high-performance power supply of a wide output voltage range of a third embodiment is illustrated. Compared with the second embodiment, the third embodiment has the following difference. In the serial to parallel conversion module 30, the conversion switch 33 adopts two single-pole double-throw switches. The positive output electrode of the second rectification branch 20 is electrically connected to a switch blade main wiring pillar of one of the single-pole double-throw switches; two auxiliary wiring pillars of the single-pole double-throw switch are electrically connected to the negative output electrode of the first rectification branch 10 and the positive connection line 31, respectively; the negative connection line 32 is electrically connected to a switch blade main wiring pillar of the other single-pole double-throw switch; one auxiliary wiring pillar of the single-pole double-throw switch is electrically connected to the negative output electrode of the first rectification branch 10; and the other auxiliary wiring pillar has no load.

The third embodiment is the same as the second embodiment except the above difference, and will not be described here.

Figure 4:
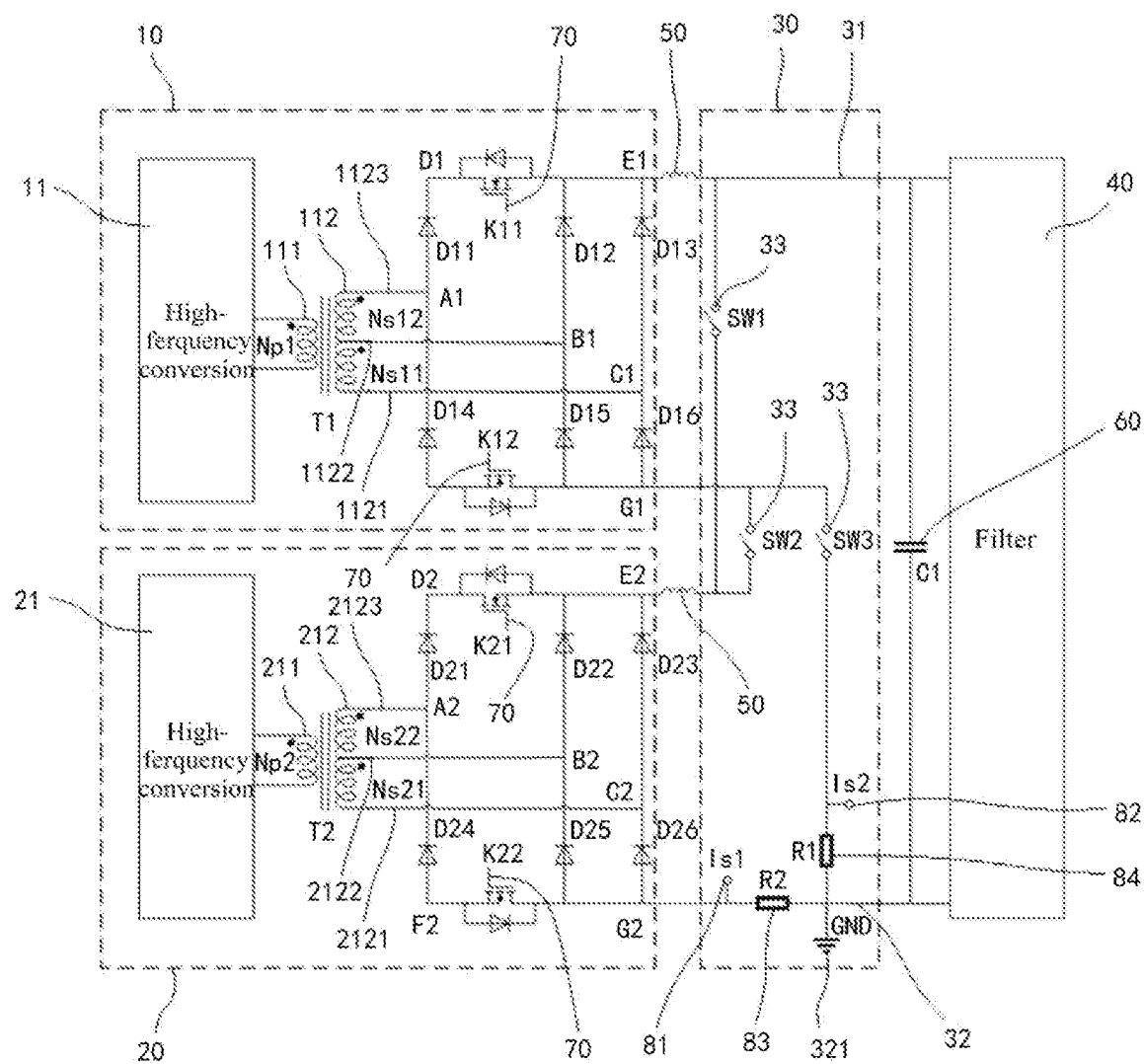
FIG. 4 is a schematic circuit diagram of a fourth embodiment of a high-performance power supply of a wide output voltage range of the present invention.

As shown in FIG. 4, a schematic circuit diagram of a high-performance power supply of a wide output voltage range of a fourth embodiment is illustrated.

Compared with the second embodiment, the fourth embodiment has the following difference. The negative connection line 32 is provided with a reference ground connection point 321 (GND); the negative output electrode of each rectification branch is provided with a level measurement point, respectively; a level test resistor is arranged between each level measurement point and the reference ground connection point 321. Furthermore, the level test resistor is provided between the reference ground connection point 321 and the corresponding conversion switch 33. Specifically, the negative output electrode of the first rectification branch 10 is provided with a second level measurement point 82 (Is2); the negative output electrode of the second rectification branch 20 is provided with a first level measurement point 81 (Is1); level test resistors are arranged between the two level measurement points and the reference ground connection point 321, that is: a first level test resistor 83 (R2) and a second level test resistor 84 (R1). The fourth embodiment is the same as the second embodiment except the above difference, and will not be described here.

On the basis of the fourth embodiment, the conversion switch 33 in the serial to parallel conversion module 30 in the fourth embodiment can also adopt a single-pole double-throw switch. When the single-pole double-throw switch in the fourth embodiment is used for assembly, the level test resistor is arranged between the reference ground connection point 321 and the corresponding single-pole double-throw switch.

Figure 5:
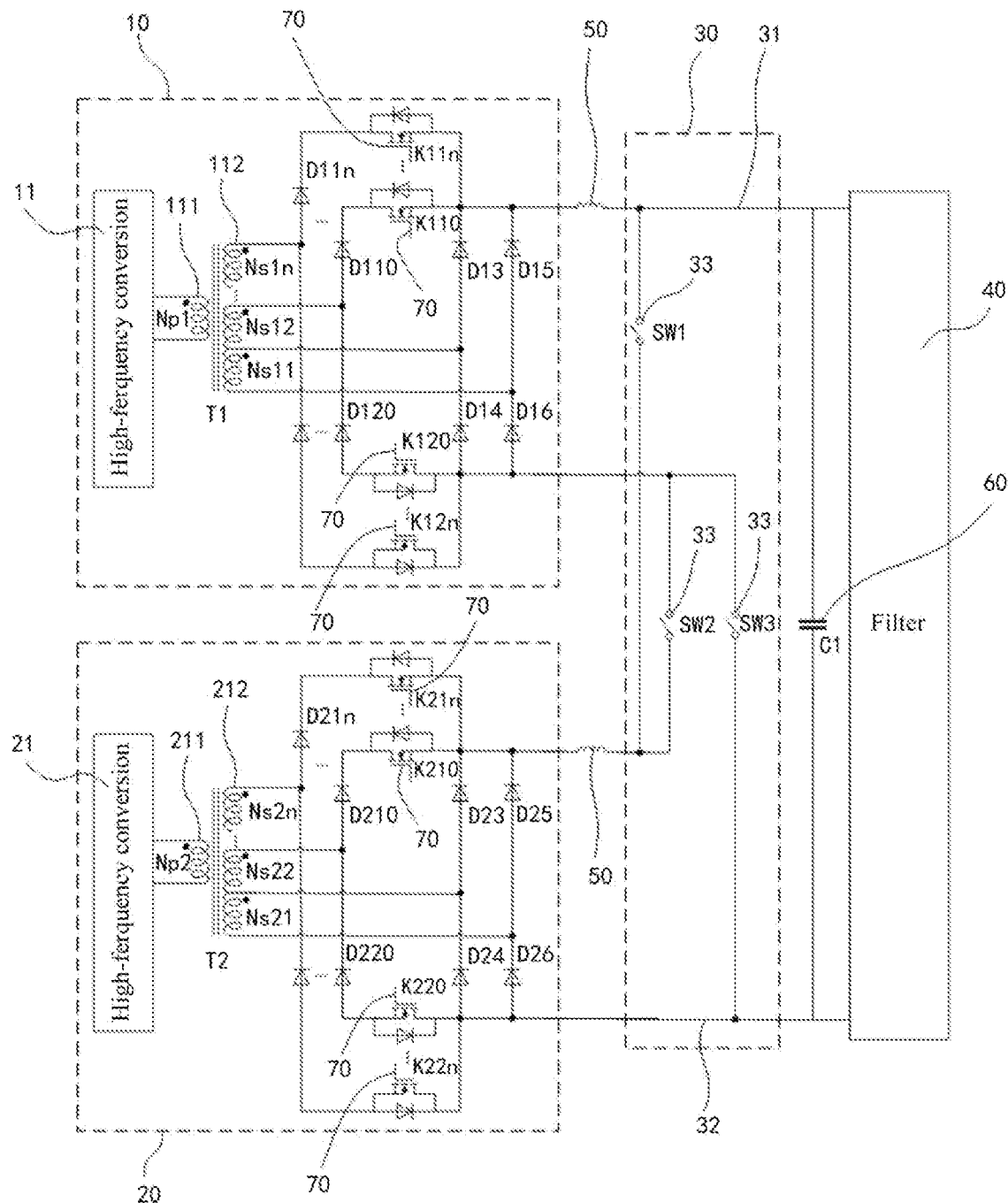
FIG. 5 is a schematic circuit diagram of a fifth embodiment of a high-performance power supply of a wide output voltage range of the present invention.

As shown in FIG. 5, a schematic circuit diagram of a high-performance power supply of a wide output voltage range of a fifth embodiment is illustrated. Compared with the second embodiment, the fifth embodiment has a difference that n (n≥4) output terminals are led out from the secondary winding of the first rectification branch 10, and m (m≥4) output terminals are led out from the secondary winding of the second rectification branch 20. The first rectification branch 10 and the second rectification branch 20 respectively have one common terminal. In the first rectification branch 10 and the second rectification branch 20, no gating switches 70 are provided on the rectification passages formed by the common terminals, the output terminal with the least number of turns between it and the common terminal, and the rectification circuits between the both, and gating switches 70 are provided on the rectification passages formed by the remaining output terminals, the common terminals and the rectification circuits between the both. In terms of the circuit layout, the fifth embodiment is the same as the second embodiment. The fifth embodiment is the same as the second embodiment except the above difference, and will not be described here.

Figure 6:
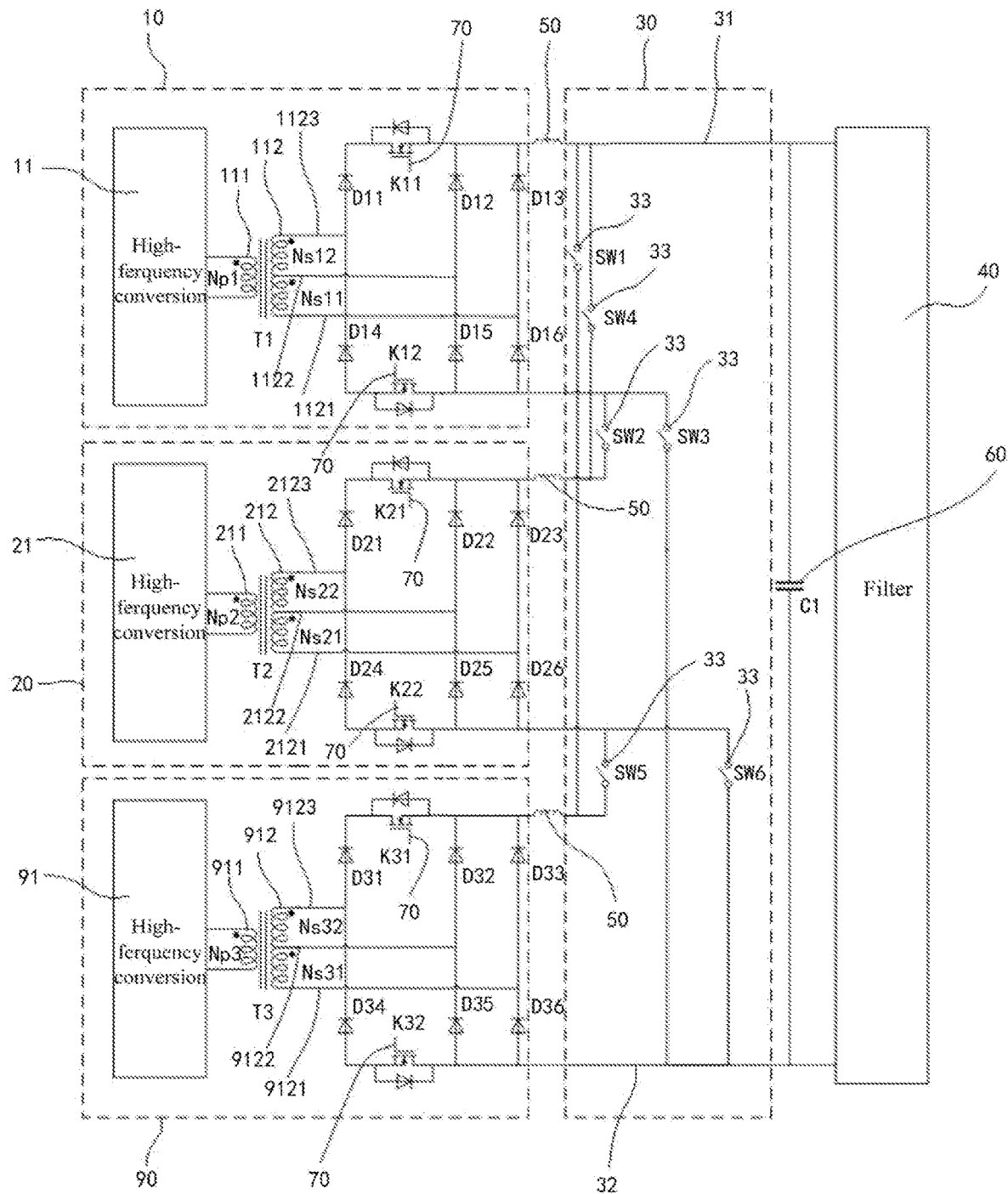
FIG. 6 is a schematic circuit diagram of a sixth embodiment of a high-performance power supply of a wide output voltage range of the present invention.

As shown in FIG. 6, a schematic circuit diagram of a high-performance power supply of a wide output voltage range of a sixth embodiment is illustrated. Compared with the second embodiment, the sixth embodiment has a different that the six embodiment includes three rectification branches, i.e., a first rectification branch 10, a second rectification branch 20 and a third rectification branch 90. The third rectification branch 90 is provided with a third transformer 91. The third transformer 91 is provided with a third primary winding 911 and a third secondary winding 912. A third common terminal 9121, a third output terminal a 9122 and a third output terminal b 9123 are led out from the third secondary winding 912. Furthermore, the circuit layout of the first rectification branch 10 of the sixth embodiment is the same as that of the first rectification branch 10 of the second embodiment. The circuit layout of the second rectification branch 20 of the sixth embodiment is the same as that of the second rectification branch 20 of the second embodiment. In addition, in the sixth embodiment, the circuit layout of the third rectification branch 90 is the same as that of the first rectification branch 10 of the embodiment.

The sixth embodiment is the same as the second embodiment except the above difference, and will not be described here.

As shown in FIG. 7, a schematic circuit diagram of a high-performance power supply of a wide output voltage range of a seventh embodiment is illustrated. In the seventh embodiment, a direct current is output by full-wave rectification. In the seventh embodiment, the first common terminal 1121 of the first secondary winding 112 of the first transformer T1 is pulled out from the middle part of the winding, so that the number of turns of the winding Ns11 is equal to the number of turns of the winding Ns14, and the number of turns of the winding Ns12 is equal to the number of turns of the winding Ns13. As shown in FIG. 7, four windings are taken as an example for description (the number of turns of the winding Ns11 is equal to the number of turns of the winding Ns14, and the number of turns of the winding Ns12 is equal to the number of turns of the winding Ns13). With reference to FIG. 8 and FIG. 9, the five output terminals of the four windings and the corresponding rectification circuits form two rectification passages. That is: when the gating switch K11 and the gating switch K12 are simultaneously turned off, the rectification circuits between the other two output terminals and the first common terminal 1121 form a first rectification passage at this time; and when the gating switch K11 and the gating switch K12 are simultaneously turned on, a second rectification passage is formed between the two rectification circuits with the gating switches and the first common terminal 1121. The seventh embodiment is the same as the first to sixth embodiments except that it adopts the full-wave rectification which is different from the full-bridge rectification of the first to sixth embodiments, and will not be repeatedly described here.

According to another aspect of the present disclosure, a control method for a high-performance power supply of a wide output voltage range is provided. The control method is applied to the foregoing high-performance power supply of a wide output voltage range for operation and control. Specifically, control driving signals applied to the primary high-frequency conversion circuit in each rectification branch are staggered from one another by a certain angle and work in an interleaving working mode.

In the transformation process of an output voltage of load equipment by using the high-performance power supply of a wide output voltage range provided by the present disclosure, phases of driving waveforms of the first rectification branch 10, the second rectification branch 20, the third rectification branch 90, and the Mth rectification branch (M≥3) are staggered. When the power supply works in the parallel mode, phases of ripple currents of inductors of the first rectification branch 10, the second rectification branch 20, the third rectification branch 90, and the Mth rectification branch are staggered by an angle and will decrease after being superposed, so that a ripple current flowing through the filter capacitor 60 decreases. When the power supply works in the series mode, since the switching waveforms of the first rectification branch 10, the second rectification branch 20, the third rectification branch 90, and the Mth rectification branch are in phase staggering, the switching frequency is equivalently increased, which makes the ripple current of the inductor decrease; and the ripple current of the filter capacitor 60 also correspondingly decreases.

Generally, the power supply (the full-bridge rectification is taken as an example) has M rectification branches (M≥2), and the number of windings of each rectification branch is N1, N2, . . . , Nm. If it is designed that the optimal working point of each branch is different, 2*(N1+N2+ . . . +Nm) optimal working points can be theoretically obtained. These optimal working points are reasonably distributed within the whole output voltage range by means of design, so that the performance of the power supply in the whole wide output voltage range can be improved. However, due to the limitation of the maximum power of the parallel operation, the actual design number of the optimal working points will be less than the theoretical number. However, a satisfactory solution can be designed as long as there is an enough number of branch windings.

The above descriptions are only the preferred embodiments of the present disclosure, and are not intended to limit the present disclosure. Any modifications, equivalent replacements and improvements that are made within the spirit and principle of the present disclosure shall fall within the protection scope of the present disclosure.

What is claimed is:

1. A high-performance power supply of a wide output voltage range,
comprising M rectification branches, M being an integer, and M≥2, wherein each rectification branch is provided with a transformer, a rectification circuit, a positive output electrode and a negative output electrode; each transformer comprises N secondary windings, N being an integer, and N≥1; the N secondary windings comprise at least N+1 output terminals; the N+1 output terminals include one common terminal, and the remaining at least N output terminals, the common terminal and the corresponding rectification circuit form L rectification passages having predetermined voltage values and different paths, wherein L≥1; each rectification passage has a positive pole and a negative pole; the positive poles form the positive output electrodes, and the negative poles form the negative output electrodes; at least L−1 rectification passages among the L rectification passages are connected in series with a gating switch; the high-performance power supply of a wide output voltage range further comprises a serial to parallel conversion module; the serial to parallel conversion module is provided with a positive connection line, a negative connection line and a plurality of conversion switches;
the positive output electrode of the first rectification branch is electrically connected to the positive connection line; the negative output electrode of the rectification branch is electrically connected to the negative connection line through the conversion switch;
the negative output electrode of the Mth rectification branch is electrically connected to the negative connection line; the positive output electrode of the rectification branch is electrically connected to the positive connection line through the conversion switch;
the positive output electrodes of the remaining second to (M−1)th rectification branches are electrically connected to the positive connection line through the conversion switches, respectively; the negative output electrodes of the remaining second to (M−1)th rectification branches are electrically connected to the negative connection line through the conversion switches, respectively; and
the negative output electrode of the Kth rectification branch is electrically connected to the positive output electrode of the (K+1)th rectification branch through the conversion switch, wherein K being an integer, K≥1 and K+1≤M.

2. The high-performance power supply of a wide output voltage range according to claim 1, wherein
in each rectification branch, in case of N=L and N≥2, the number of turns of the secondary windings between the common terminal and the remaining N output terminals increase in sequence;
the rectification circuit among the common terminal, the output terminal of the secondary winding with the least number of turns between it and the common terminal, the positive output electrode, and the negative output electrode are respectively provided with diodes or synchronous rectification MOSFET, but are provided with no grating switch; and
the rectification circuits between the remaining N−1 output terminals and the positive output electrode are provided with gating switches and diodes, and the rectification circuits between the remaining N−1 output terminals and the negative output electrode are provided with gating switches and diodes; or, the rectification circuits between the remaining N−1 output terminals and the positive output electrode are provided with gating switches and synchronous rectification MOSFETs, and the rectification circuits between the remaining N−1 output terminals and the negative output electrode are provided with gating switches and synchronous rectification MOSFETs.

3. The high-performance power supply of a wide output voltage range according to claim 2, wherein a filter capacitor is connected in parallel between the positive connection line and the negative connection line, and/or the positive connection line and the negative connection line are connected with filters.

4. The high-performance power supply of a wide output voltage range according to claim 3, wherein in each rectification branch, an inductance element is arranged between the positive output electrode and the positive connection line or between the negative output electrode and the negative connection line.

5. The high-performance power supply of a wide output voltage range according to claim 4,
comprising a first rectification branch and a second rectification branch, wherein
in the first rectification branch, the secondary winding of the transformer in the first rectification branch is provided with a first common terminal, a first output terminal a and a first output terminal b; diodes are respectively provided on the rectification circuits between the first common terminal and the positive output electrode as well as the negative output electrode; diodes are respectively provided on the rectification circuits between the first output terminal a and the positive output electrode as well as the negative output electrode; a diode and a gating switch are provided on the rectification circuit between the first output terminal b and the positive output electrode; a diode and a gating switch are provided on the rectification circuit between the first output terminal b and the negative output electrode; and in the second rectification branch, the secondary winding of the transformer in the second rectification branch is provided with a second common terminal, a second output terminal a and a second output terminal b; diodes are respectively provided on the rectification circuits between the second common terminal and the positive output electrode as well as the negative output electrode; diodes are respectively provided on the rectification circuits between the second output terminal a and the positive output electrode as well as the negative output electrode; a diode and a gating switch are provided on the rectification circuit between the second output terminal a and the positive output electrode; a diode and a gating switch are provided on the rectification circuit between the second output terminal b and the negative output electrode.

6. The high-performance power supply of a wide output voltage range according to claim 5, wherein in the serial to parallel conversion module, the conversion switch adopts two single-pole double-throw switches; the positive output electrode of the second rectification branch is electrically connected to a switch blade main wiring pillar of one of the single-pole double-throw switches; two auxiliary wiring pillars of the single-pole double-throw switch are electrically connected to the negative output electrode of the first rectification branch and the positive connection line, respectively; the negative connection line is electrically connected to a switch blade main wiring pillar of the other single-pole double-throw switch; one auxiliary wiring pillar of the single-pole double-throw switch is electrically connected to the negative output electrode of the first rectification branch; and the other auxiliary wiring pillar has no load.

7. The high-performance power supply of a wide output voltage range according to claim 5, wherein the negative connection line is provided with a reference ground connection point; level measurement points are provided on the negative output electrodes of the first rectification branch and the second rectification branch, respectively; and level test resistors are arranged between the two level measurement points and the reference ground connection point, respectively.

8. The high-performance power supply of a wide output voltage range according to claim 2, wherein the negative connection line is provided with a reference ground connection point; a level measurement point is provided on the negative output electrode of each rectification branch, respectively; and a level test resistor is arranged between each level measurement point and the reference ground connection point.

9. A control method applied to the high-performance power supply of a wide output voltage range according to claim 1, wherein control driving signals applied to a primary high-frequency conversion circuit in each rectification branch are staggered from each other by a certain angle and work in an interleaving working mode.

* * * * *